United States Patent [19]

Council, Jr.

[11] Patent Number: 5,718,154
[45] Date of Patent: Feb. 17, 1998

[54] RECIPROCATING TOOL HOLDER ASSEMBLY

[75] Inventor: Buford W. Council, Jr., Ruskin, Fla.

[73] Assignee: Bausch & Lomb, Inc., Rochester, N.Y.

[21] Appl. No.: 671,407

[22] Filed: Jun. 27, 1996

[51] Int. Cl.⁶ ............................................ B23B 3/28
[52] U.S. Cl. ........................... 82/1.11; 82/158; 82/12
[58] Field of Search ............................ 82/12, 137, 158, 82/1.11

[56] References Cited

U.S. PATENT DOCUMENTS

| | | | |
|---|---|---|---|
| 4,203,062 | 5/1980 | Bahten | 318/571 |
| 4,625,602 | 12/1986 | Korson | 82/158 |
| 4,911,044 | 3/1990 | Mishiro | 82/158 |
| 4,947,715 | 8/1990 | Council, Jr. | 82/1.11 |
| 5,101,699 | 4/1992 | Nezu | 82/158 |
| 5,152,202 | 10/1992 | Strauss | 82/134 |
| 5,170,358 | 12/1992 | Delio | 364/474.19 |
| 5,251,522 | 10/1993 | Chin-Long | 82/134 |
| 5,284,076 | 2/1994 | Fritz | 82/158 |
| 5,291,812 | 3/1994 | Yen et al. | 82/134 |

FOREIGN PATENT DOCUMENTS

1047063  11/1966  France .

Primary Examiner—Daniel W. Howell
Assistant Examiner—Mark Williams
Attorney, Agent, or Firm—C. Douglas McDonald, Jr. & Associates, P.A.

[57] ABSTRACT

A reciprocating tool post assembly is disclosed that may provide substantially linear excursions of a cutting tool mounted therein. The apparatus includes a voice coil assembly having a longitudinal axis that provides for the reciprocating movement of the assembly and to which a pair of coil arms is attached. The assembly also includes a pair of lever arms, each being pivotally attached between a respective coil arm and a draw bar, with a pair of fulcrum members attached to a base of the assembly that engage each respective lever arm to provide a fulcrum about which each respective lever arm may pivot. One end of the draw bar is attached to a tool support that is guided in a substantially axial movement by a guide member, such that, when a cutting tool is attached to the tool support and the movement of the voice coil causes the cutting tool to reciprocate substantially axially with respect to the base.

18 Claims, 4 Drawing Sheets

RECIPROCATING TOOL HOLDER ASSEMBLY

BACKGROUND OF THE INVENTION

This invention relates generally to a reciprocating tool holder assembly. More particularly, it relates to a tool holder assembly that provides substantially axial excursions of a cutting tool that may be positioned therein.

In various fields it is desired to reciprocate a cutting tool at high speed into and from engagement with a work piece. One such field is that of optics, particularly the fields of optometry and ophthalmology, in which it is often desirable to cut aspheric surfaces on work pieces, such as contact lenses. Numerous visual defects in persons may be corrected through corrective lenses having at least one, and often more than one, aspheric surface. In order to form suitable lenses for such visual impairments, it is necessary to reciprocate a cutting tool in a precise axial manner.

Numerous prior art cutting tool assemblies have been proposed that rapidly reciprocate a cutting tool into engagement and away from a work piece. For example, U.S. Pat. No. 4,203,062 describes a cutting tool that is attached to a flexible diaphragm and is rapidly reciprocated in a tool holder driven by an electro-magnetic voice coil. Similarly, U.S. Pat. No. 5,152,202 describes a cutting tool that is mounted to an arm with one end pivotally attached to a base and the other end connected to a moveable armature that is rapidly reciprocated by a linear motor. A careful examination of this and other prior art readily leads one to the conclusion that conventional reciprocating tool post assemblies fail to address completely the needs of the industry.

SUMMARY OF THE INVENTION

In view of the foregoing, it is desired to provide a reciprocating tool holder assembly for reciprocating a cutting tool at high speeds. More particularly, it is desired to provide a reciprocating tool holder assembly that may provide substantially linear and high speed excursions of a cutting tool that may be attached thereto. It is also desired to provide a reciprocating tool holder assembly having means to adjust the amount of axial reciprocation. It is still further desired to provide a reciprocating tool holder assembly in which the reciprocation of the cutting tool may easily be controlled. To achieve these and other objects that will become apparent to those skilled in the art, the present invention provides a reciprocating tool holder assembly primarily intended to provide substantially linear excursions of a cutting tool that may be attached thereto. The reciprocating action of the tool holder assembly is provided by a voice coil assembly that includes a coil body, a plurality of windings subscribing at least a portion of the coil body and at least one pole piece positioned proximal the coil body to provide a magnetic field transverse to the coil body axis. The coil body has an axis extending longitudinally between its first and second ends, with a pair of coil arms that are attached to the coil body on generally opposite sides of said coil axis proximal the coil body first end. The assembly also includes a pair of lever arms, each having first and second ends and an axis extending therebetween, with the first end of each lever arm pivotally attached to a respective coil arm by a first pivotal attachment with the axis of each lever arm extending substantially transverse to the coil body axis. A pair of fulcrum members are attached to the base of the assembly to engage a respective adjacent lever arm intermediate its first and second ends to provide a fulcrum about which each lever arm may pivot. The second end of each lever arm is pivotally attached to an elongated draw bar by a second pivotal attachment. The draw bar has two ends and a longitudinal axis, with the draw bar axis aligned generally parallel to the coil body axis. The end of the draw bar distal the coil body is attached to a tool support that is preferably dimensioned and configured for receiving a cutting tool. The tool support is attached to a guide member that is attached to the base of the assembly. A cutting tool, preferably having an axis generally coaxial with the draw bar axis, is attached to and extends from the tool support distal the coil body, whereby providing alternating current the coil windings results in substantially linear, axial excursions of the cutting tool.

BRIEF DESCRIPTION OF THE DRAWINGS

One particularly preferred embodiment of the apparatus of the present invention is illustrated in the accompanying drawings, in which.

DETAILED DESCRIPTION

Figures 3, 4:
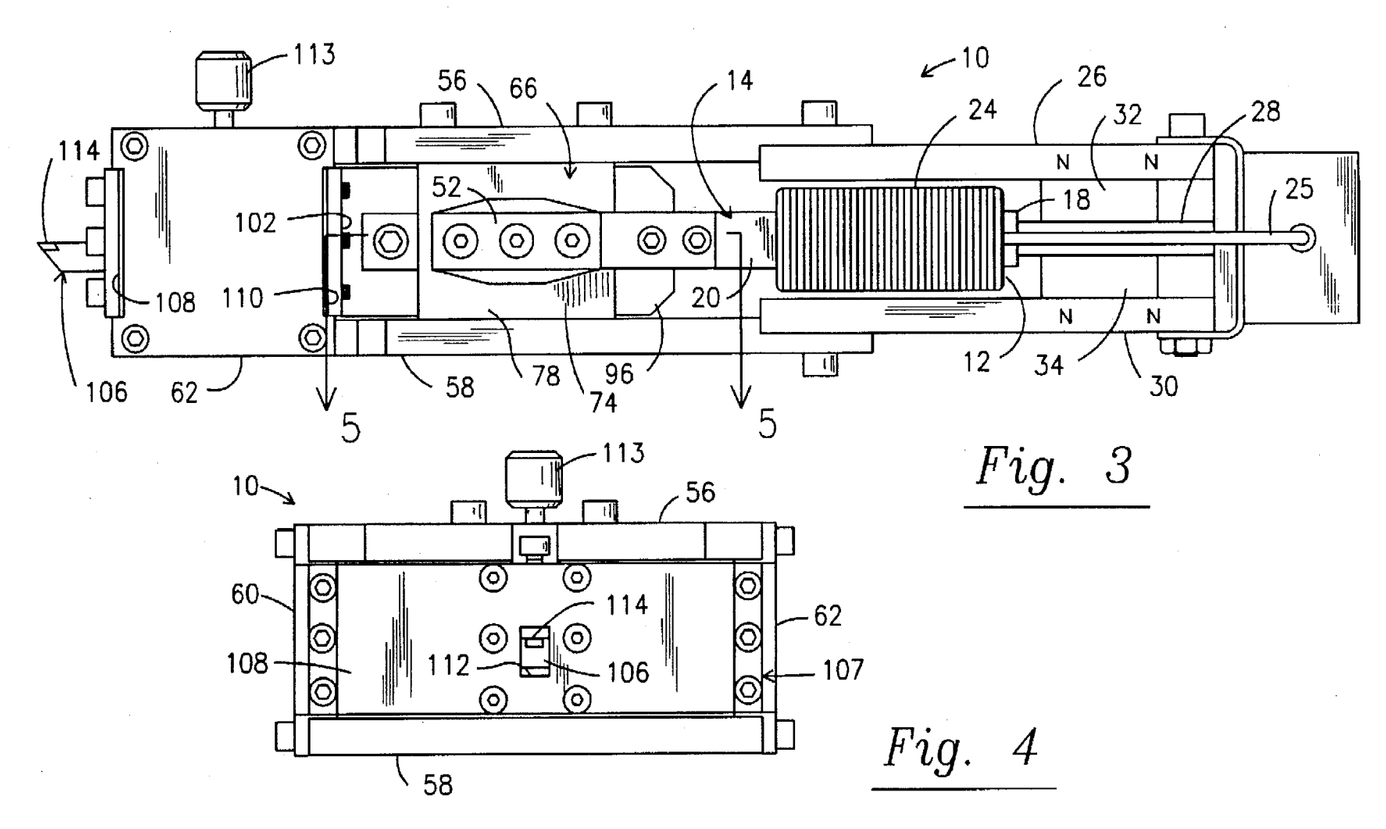
FIG. 3 is a side elevational view of the apparatus of FIG. 1.
FIG. 4 is a front elevational view of the apparatus of FIG. 1.
Figure 5:
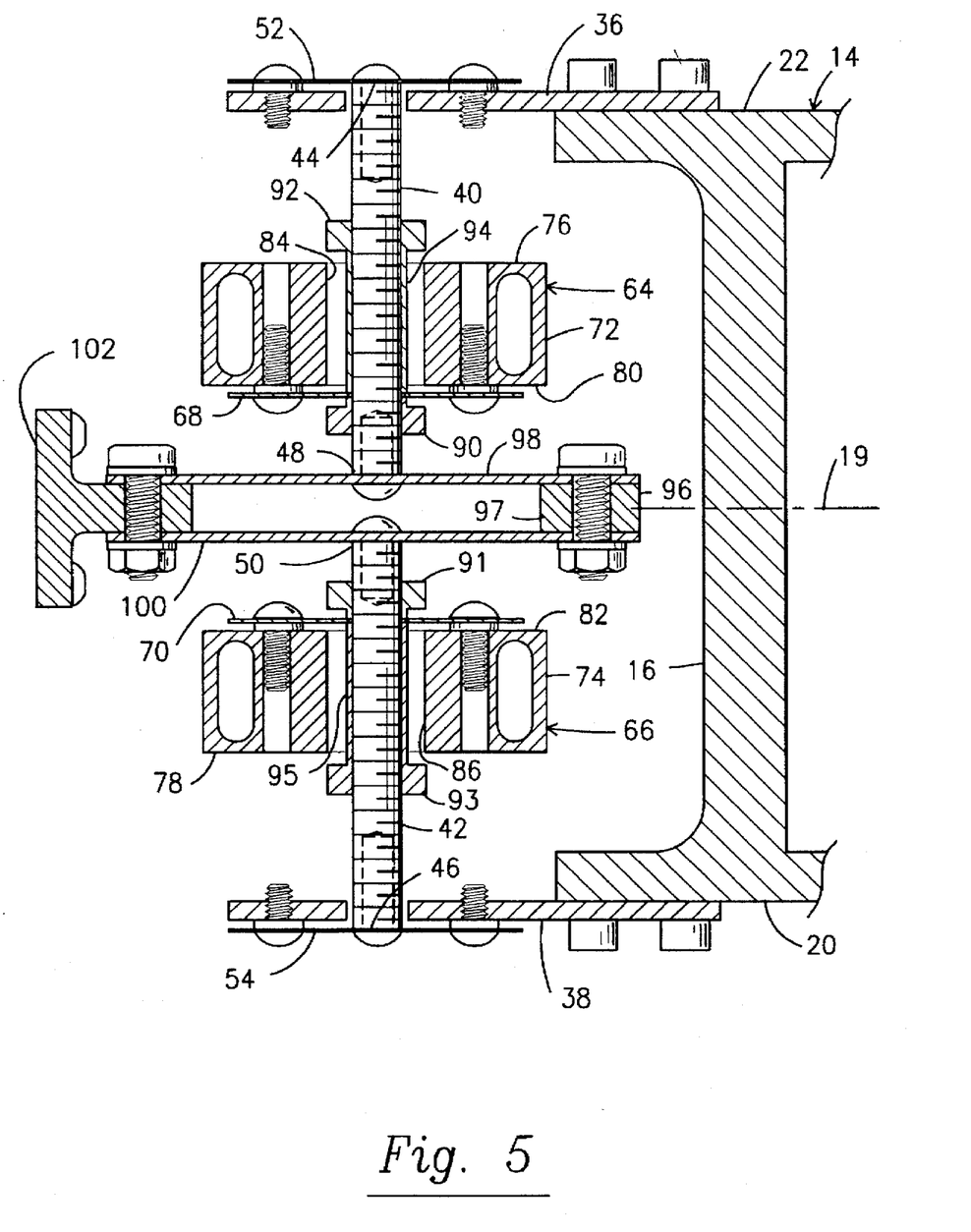
FIG. 5 is a frontal view, partially in section of the apparatus of FIG. 3 taken along lines 5—5.

A preferred embodiment of the reciprocating tool holder assembly 10 of the present invention is illustrated in FIGS. 1–5 in which similar reference characters refer to similar parts throughout the several views of the drawings. The reciprocating action of the assembly is generally provided by a conventional voice coil 12 that suitably includes a coil body 14 of generally rectangular cross section that may suitably be formed of a metal member, such as an aluminum alloy or iron. The coil body 14 includes a first end 16, a second end 18 and a longitudinal first axis 19 extending therebetween, and a pair of generally opposed sidewalls 20 and 22 generally extending between the first and second ends 16 and 18, respectively. Preferably, the coil body 14 is coated with an insulating material, suitably a high temperature resistant epoxy material and a conventional fiber resin, such as fiberglass saturated tape, or other materials well known in the art. A plurality of windings 24 circumscribe at least a portion of the coil body 14 and preferably include multiple layers of a suitably electrically conductive material such as, for example, a length of an aluminum wire. Preferably, each layer of windings 24 is appropriately coated with a layer of a suitable insulating material. At least one pole piece 26, although preferably a plurality of pole pieces, such as pieces 26, 28, 30, 32 and 34, are positioned proximal the coil body to provide a magnetic field transverse to the coil windings. As illustrated in FIG. 3, a preferred orientation of the pole pieces includes positioning the three magnetized plates 26, 28, and 30, suitably formed of cold rolled steel, in a spaced apart and substantially parallel relation positioned adjacent the coil body 14 with two bar magnets 32 and 34, suitably formed of rare earth elements, such as neodymium, iron and/or boron or other materials with appropriate magnetic properties, interposed between the respective pole pieces 26, 28, and 30. Each pole piece is polarized with north and south pole ends, preferably oriented in a repulsive relation such that the respective north and south poles of each pole piece 26, 28, 30, 32 and 34 are positioned adjacent one another. This arrangement produces a magnetic field that is substantially perpendicular to the coil windings. Accordingly, when an alternating electrical current is introduced to the coil windings 24, the voice coil 12 provides axial, bidirectional forces that are proportional to the magnitude of alternating electrical current passed through the coil windings 24.

A pair of coil arms 36 and 38 are spaced apart and attached to the coil body first end 16 in a substantially parallel relation on generally opposite sides of the coil body axis 19. A pair of lever arms 40 and 42, with each respective arm 40 and 42 having a respective first end 44 and 46 and a respective second end 48 and 50, are formed of a rigid material, such as steel or other suitably rigid materials known in the art, and each lever arm 40 and 42 has a central axis extending longitudinally of the arm. As illustrated in the figures, each lever arm first end 44 and 46 is pivotally attached to the respective coil arm 36 and 38 by a first pivotal attachment such that the axis of each lever arm 40 and 42 extends generally transverse to the coil axis 19.

The preferred construction of the first pivotal attachment of each lever arm first end 44 and 46 to the respective coil arm 36 and 38 includes attaching a member or an arm flexure 52 and 54 of a generally rigid and resilient material, such as a panel of spring steel or the like, to each coil arm 36 and 38 distal the coil body 14. Such flexures 52 and 54 preferably include an aperture formed therethrough for receiving a fastener that may attach each respective lever arm 40 and 42 to its respective coil arm flexure 52 and 54, which are attached to its respective coil arm 36 and 38. The lever arm first ends 44 and 46 are preferably drilled and tapped for receiving such a threaded fastener therein to secure the respective lever arms 40 and 42 to the respective arm flexures 52 and 54. An aperture having the diameter greater than that of each lever arm 40 and 42 preferably is formed through each coil arm 36 and 38 to permit the pivotal movement of the lever arm 40 and 42 in its attachment to the respective arm flexure 52 and 54. Of course, it will be understood and appreciated that other pivotal attachments known in the art may suffice including, without limitation, universal joints, roller bearings or hinged connections.

Figure 1:
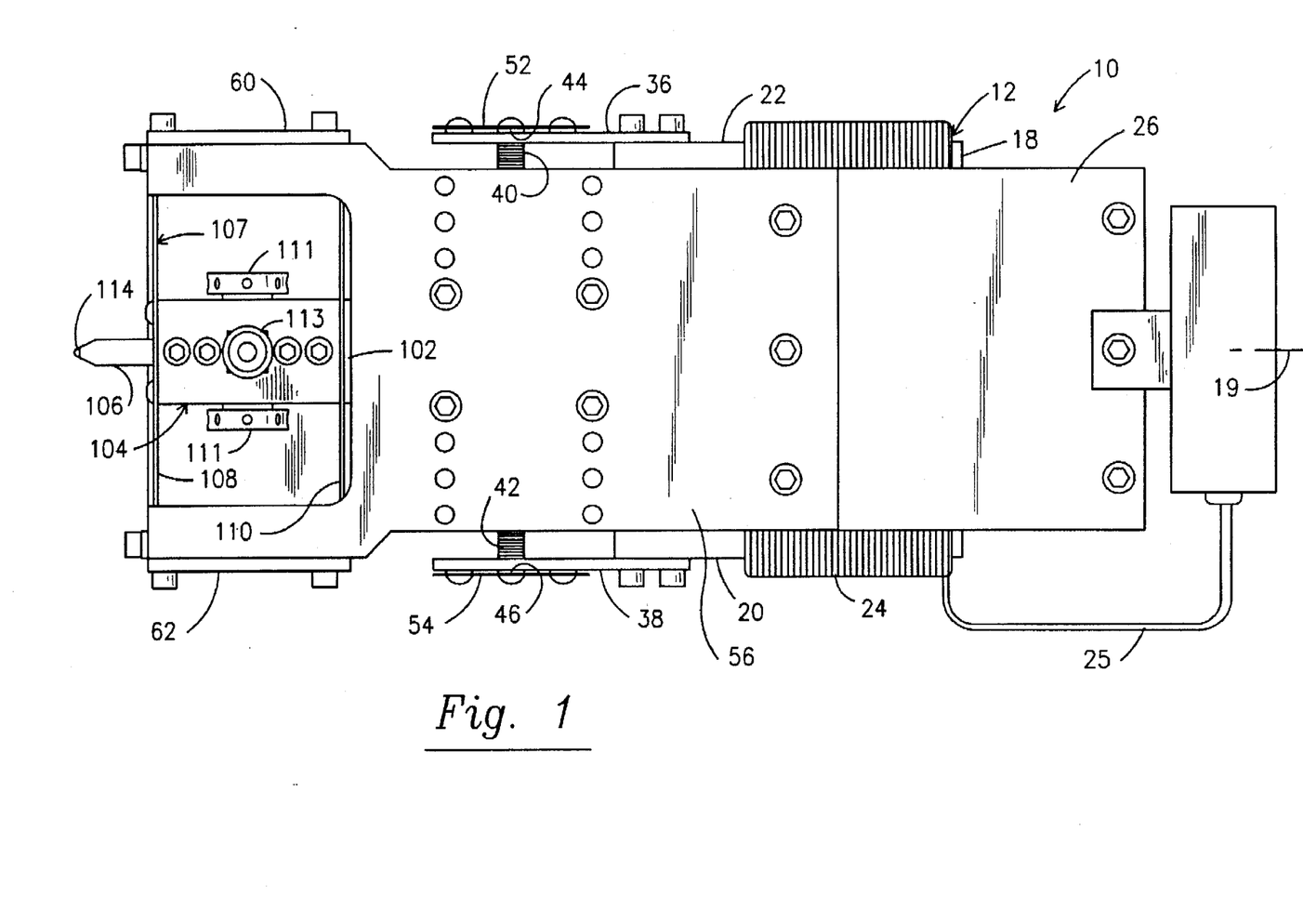
FIG. 1 is a top plan view of a tool assembly of a preferred embodiment of the present invention.
Figure 2:
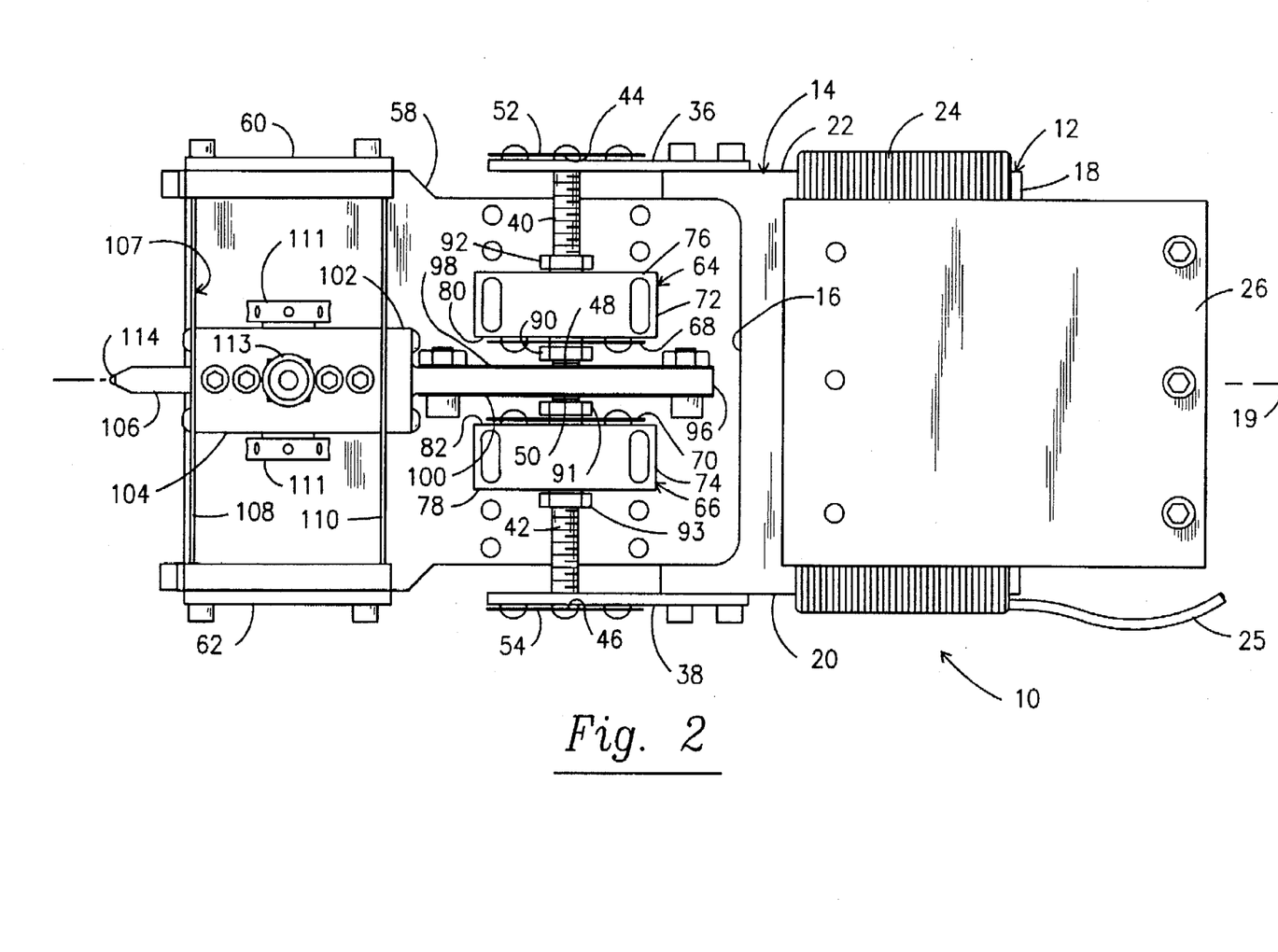
FIG. 2 is top view of the tool holder assembly of FIG. 1 with the top base portion removed.

As illustrated in the FIGS. 1, 3 and 4, the tool holder assembly 10 also includes a base having an upper portion 56, a lower portion 58 and a pair of generally opposed sidewalls 60 and 62 extending between at least portion of the upper and lower base portions 56 and 58, respectively. A pair of fulcrum members, generally indicated as 64 and 66, are attached to the base and are positioned such that each member engages a respective lever arm 40 or 42 to provide a fulcrum about which the respective lever arm 40 and 42 may pivot. In the preferred embodiment illustrated in FIGS. 2 and 5, each fulcrum member includes a respective fulcrum flexure 68 and 70 having an aperture formed therethrough, the diameter of which aperture is greater than the diameter of the respective lever arm, although preferably close fitting, such as, for example, about a 0.002 inch difference in respective diameters. Such fulcrum flexures 68 and 70 are suitably formed of a generally resilient and rigid material, such as a panel of conventional spring steel, and may suitably have a thickness of about 0.02 inches. Each fulcrum flexure 68 and 70 is preferably attached to a respective fulcrum block 72 and 74 that is attached to the base, suitably to at least one of the upper base portion 56 and the lower base portion 58, and preferably attached between both the upper and lower base portions 56 and 58, respectively.

Accordingly, the upper and lower base portions 56 and 58, respectively, may include appropriate bores through which conventional fasteners, such as screws, may extend and attach the respective base portions to the fulcrum blocks 72 and 74. Each respective fulcrum block 72 and 74 has a respective first end 76 and 78, a respective second end 80 and 82 and a respective aperture 84 and 86, having an axis formed therethrough, with at least a portion of each lever arm 40 and 42 extending through the respective fulcrum block aperture 84 and 86, generally parallel to and preferably coaxially with the aperture axis. The attachment between the fulcrum blocks 72 and 74 and the respective upper and lower base portions preferably provide for an adjustable attachment for selectively positioning each fulcrum block 72 and 74 axially along each respective lever arm 40 and 42 closer to or farther from a draw bar 88 that is positioned therebetween. This provides for an adjustable mechanical advantage or lever ratio, suitably from about 1:1 to about 10:1. Each fulcrum flexure 68 and 70 is preferably spaced from the respective fulcrum block second ends 80 and 82 to permit substantially free movement of each flexure 68 and 70 proximal its respective lever arm 40 and 42, such as by positioning a conventional washer therebetween.

In order to provide the desired amount of reciprocation of the tool holder 10 of the present invention, each lever arm 40 and 42 is preferably formed of a threaded rod to which a pair of threaded fastener members, suitably nuts dimensioned and configured for a locking attachment to each threaded rod 40 and 42, may be threaded for axial movement along each threaded lever arm 40 and 42 on opposing sides of each fulcrum flexure 68 and 70. As shown in the preferred embodiment of FIG. 5, each pair of threaded fastener members 90, 92, and 91, 93 secures a respective fulcrum flexure to a predetermined position along each threaded lever arm 40 and 42. In order to accomplish such attachment, each fastener member 92 and 93 preferably includes a shoulder, preferably a generally cylindrical shoulder, 94 and 95, respectively, that extends a predetermined distance from one end of the respective fastener member 92 and 93, suitably a length greater than the distance between the first and second ends of each fulcrum block 72 and 74, and which may be conveniently threaded for axial movement along each threaded lever arm 40 and 42. Fastener members 90 and 91 may each also include a shoulder, although suitably of shorter length than shoulders 94 and 95, such that the shoulders of adjacent pairs of fastener members 90, 92 and 91, 93 may engage opposing sides of each respective flexure 68 and 70 to provide a fixed fulcrum point. Accordingly, with the fulcrum blocks 72 and 74 attached to the base and the respective fulcrum flexures 68 and 70 engaging the lever arms 40 and 42, respectively, at a fixed position, the lever arms 40 and 42 may pivot about the fulcrum flexures 68 and 70 when the voice coil is activated, such that opposing ends of each lever arm 40 and 42 will reciprocate in opposing directions about each fulcrum flexure 68 and 70 in accord with the mechanical advantage defined by the axial positioning of the fulcrum flexures 68 and 70 along each respective lever arm 40 and 42.

Each respective lever arm second end 48 and 50 is pivotally attached to an elongated draw bar 96 by a second pivotal attachment, with the draw bar 96 having two ends and a longitudinal axis aligned generally parallel to the coil axis. As illustrated FIGS. 2 and 5, each second pivotal attachment may be provided by forming an aperture 97 generally normal to the draw bar axis and extending through at least a portion of the draw bar 96, generally at the position of desired attachment between the respective lever arm second ends 48 and 50 and the draw bar 96. A pair of resilient thrust flexures 98 and 100, suitably formed of a panel of spring steel or other generally rigid well known material, are attached to the lever arm second ends 48 and 50 and appropriately attached to opposed sides of the draw bar 96. Obviously, numerous other types of pivotal attachment may be used with equal facility.

The draw bar end 102 distal the coil body 14 is attached to a tool support, generally indicated as 104, that is appropriately configured for holding a cutting tool 106, preferably generally coaxially with the draw bar axis. The tool support 104 is attached to a guide structure, generally indicated as 107, for allowing reciprocating movement of the tool support 104 generally parallel to the draw bar axis while simultaneously restraining motion transverse to the draw bar axis. In the preferred embodiment illustrated in FIG. 2, the guide structure 107 includes at least one flexure 108 or 110, although preferably a pair of front and rear flexures 108 and 110 spaced apart by tool support 104 and substantially parallel to provide a substantially axial reciprocating movement of the tool support 104. The front and rear flexures 108 and 110 are attached to the base, preferably between the sidewall portions 60 and 62, substantially normal to the draw bar axis. The flexures 108 and 110 are formed of a resilient material, such as panels of spring steel or the like, and suitably may have a thickness of about 0.04 inches. It will be understood and appreciated by those skilled in the art that alternative constructions of the guide structure 107 that may provide the desired axial movement of the tool support such as, for example, ball bushings or other axial guides, may be used with equal facility. The cutting tool 106 is mounted to the tool support 104 suitably by clamping it within the support 104, such as by threaded clamps 111 and 113, preferably generally parallel to or coaxially with the draw bar axis, with at least a portion of the cutting tool 106 extending through an aperture 112 formed through the front flexure 108. The cutting tool 106 has a cutting edge 114 positioned distal the tool support 104, which suitably includes an industrial diamond or other substantially hard material suitable for cutting.

With the structure of the reciprocating tool holder assembly described above, it may be seen that the present invention provides an apparatus for reciprocating a cutting tool in a substantially axial direction. By introducing an alternating electrical current to the coil windings 24, the coil body 14 vibrates in a controlled manner, suitably proportional to the amount of current being introduced. The forces created by the bi-directional movement of the coil body 14 in the direction of the coil axis are transferred to the respective lever arms 40 and 42 through the pivotal attachment of each respective lever arm first end 44 and 46 and its respective coil arm 36 and 38. Accordingly, each respective lever arm first end 44 and 46 moves according to the reciprocation of its respective coil arm 36 and 38, with each respective lever arm 40 and 42 pivoting about its respective fulcrum member 64 and 66, such that the pivotal attachment between the respective lever arm second ends 48 and 50 and the draw bar 96 cause the draw bar to move in the opposite direction of the coil arms 36 and 38. Thus, the pivoting movement of each lever arm 40 and 42 effects a reciprocating movement of the draw bar 96 and tool support 104 generally parallel to the coil body axis 19. Consequently, attaching cutting tool 106 to the tool support 104 results in reciprocating the cutting tool in a direction generally parallel to the coil body axis 19. By appropriately adjusting the axial position of the fulcrum flexures 68 and 70 along each lever arm 40 and 42, the mechanical advantage of the lever arms 40 and 42 may appropriately be increased and decreased. As described with respect to the preferred embodiment, such adjustments may be conveniently accomplished by axially moving fastener members 90, 92 and 91, 93 along the respective threaded lever rods 40 and 42 and clamping such fasteners to the respective fulcrum flexures 68 and 70 at a desired position.

It will be understood and appreciated that the tool holder assembly 10 of the present invention moves in a direction opposite the movement of the voice coil and, thus, cancels the forces of movement of the voice coil 12. The movement of the coil arm caused by the axial, bidirectional forces of the voice coil 12 are transferred in an opposite direction to the draw bar 96 and, in turn, to the cutting tool 106. Accordingly, substantially no vibrations are created and no further counter balancing is required. Such construction efficiently utilizes substantially all the power introduced to the voice coil 12 to produce the reciprocating movement of the cutting tool 106.

Axial tool excursions for this apparatus typically range from the rest position up to about 0.30 mm in both directions thereof. Of course the amount of excursion of the tool support 104 may be appropriately increased and decreased by varying the rigidity of the front and rear flexures 108 and 110, varying the stiffness of the pivotal attachments, and, by adjusting the position of the fulcrum flexures 68 and 70 along the lever arms 40 and 42.

While the foregoing describes a particularly preferred embodiment of the apparatus and method of this invention, it is to understood that this description and the illustrations are to be indicative only of the principles of the present invention and are not to be considered limitative thereof. Accordingly, because numerous variations and modifications of this apparatus, all within the scope of this invention, will readily occur to those skilled in the art, the scope of the invention is to be limited solely by the claims appended hereto.

What is claimed is:

1. A reciprocating tool holder assembly primarily intended to provide substantially axial excursions of a cutting tool positioned therein, said tool holder assembly comprising:

a base having an upper portion and a lower portion and a pair of generally opposed side walls extending between said upper and lower base portions;

a voice coil assembly attached to said base and including a coil body, a plurality of windings circumscribing at least a portion of said coil body, said coil body having a first end, a second end and an axis extending between said coil body first and second ends, and at least one pole piece positioned proximal said coil body to provide a magnetic field substantially transverse to said coil body axis;

a pair of coil arms attached to said coil body on generally opposite sides of said coil axis proximal said coil body first end;

a pair of lever arms, each having a first end, a second end and an axis extending between said first end and said second end, said first end being pivotally attached to a respective said coil arm by a first pivotal attachment with said axis of each said lever arm extending substantially transverse to said coil body axis;

a pair of fulcrum members attached to said base, each said fulcrum member positioned adjacent each said lever arm to engage a respective said lever arm intermediate said lever arm first and second ends to provide a fulcrum about which each said lever arm may pivot;

an elongated draw bar having two ends and a longitudinal axis, said draw bar being pivotally attached to each said lever arm second end by a second pivotal attachment, with said draw bar axis aligned generally parallel to said coil body axis;

a tool support attached to said draw bar end distal said coil body;

a guide structure attached to said tool support and to said base for allowing reciprocating movement of said tool support while restraining motion transverse to said draw bar axis; and a cutting tool having an axis generally aligned with said draw bar axis, said cutting tool attached to and extending from said tool distal said coil body, whereby providing alternating electrical current to the coil windings results in substantially linear, axial excursions of the cutting tool.

2. A reciprocating tool holder assembly as claimed in claim 1 wherein said first pivotal attachment comprises a substantially resilient member attached to each said lever arm first end and to each respective said coil arm.

3. A reciprocating tool holder assembly as in claim 2 wherein each said coil arm includes an aperture formed therethrough, through which each said lever arm unobtrusively extends.

4. A reciprocating tool holder assembly as claimed in claim 1 wherein each said second pivotal attachment comprises a substantially resilient thrust member attached to each said lever arm second end and attached to said draw bar.

5. A reciprocating tool holder assembly as in claim 1 wherein each said fulcrum member further comprises:

a fulcrum block attached to said base, each said fulcrum block having a first end, a second end and an aperture having a diameter and an axis formed therethrough, with at least a portion of the respective said lever arm extending through the respective said fulcrum block aperture and generally parallel to said fulcrum block axis; and a resilient fulcrum flexure attached to said second end of each said fulcrum block distal its respective said coil arm, said fulcrum flexure having an aperture formed therethrough, each said fulcrum flexure extending generally normal to its respective said lever arm with each said lever arm extending through its respective said fulcrum flexure aperture.

6. A reciprocating tool holder assembly as in claim 5 wherein each said fulcrum block is adjustably attached to said base and to said lever arm for selective positioning axially along its respective said lever arm closer to or farther from said draw bar, whereby positioning the fulcrum blocks closer to and farther from the draw bar respectively decreases and increases the amount of axial excursion of the cutting tool caused by movement of the voice coil.

7. A reciprocating tool holder assembly as in claim 6 wherein each said fulcrum block is attached between said upper base portion and said lower base portion.

8. A reciprocating tool holder assembly as in claim 5 wherein each said lever arm comprises a threaded rod.

9. A reciprocating tool holder assembly as in claim 8 further comprising a pair of threaded fastener members dimensioned and configured for locking attachment to each said threaded rod, each said pair of fastener members engaging a respective said fulcrum flexure such that axial movement of each said fulcrum flexure with respect to its respective said threaded rod is restrained.

10. A reciprocating tool holder assembly as in claim 9 wherein at least one said fastener member of each said fastener member pair comprises a nut having an axis and two ends, with a shoulder extending from one end for engaging said fulcrum flexure opposite the other of the respective said fastener member pair.

11. A reciprocating tool holder assembly as in claim 10 wherein said shoulder comprises a generally cylindrical shoulder having an outer diameter that is less than its respective said fulcrum block aperture diameter.

12. A reciprocating tool holder assembly as in claim 1 wherein said guide structure comprises a rear flexure attached to said base distal said coil substantially normal to said coil body axis and attached to said tool support, with said draw bar end distal said coil body attached to said rear flex panel.

13. A reciprocating tool holder assembly as in claim 12 wherein said guide structure further comprises a front flexure attached to said tool support to said base distal said draw bar, spaced apart from and substantially parallel to said rear flex panel.

14. A reciprocating tool holder assembly as in claim 1 wherein said front flexure includes an aperture with at least a portion of said cutting tool extending through said aperture.

15. A reciprocating tool holder assembly as in claim 1 wherein said cutting tool includes a cutting edge distal said tool support.

16. A reciprocating tool holder assembly as in claim 1 further comprising:

a plurality of pole pieces positioned proximal said coil windings, each said pole piece having north and south pole ends, said north and south pole end of each said pole piece positioned adjacent each respective north and south pole end of adjacent said pole pieces, such that a magnetic field substantially perpendicular to said coil windings is provided.

17. A method for reciprocating a cutting tool in a predetermined direction, said method comprising the steps of:

reciprocating a pair of coil arms along a first axis, each said coil arm having first and second ends;

pivotally attaching a lever arm to each said coil arm first end, each said lever arm having a first end, a second end and a longitudinal axis extending between said first and second ends, said lever arm axis being substantially transverse to said first axis, with each said lever arm first end pivotally attached to the respective said coil arm first end;

pivoting each said lever arm about a fulcrum as said pair of coil arms is reciprocated;

pivotally attaching said second end of said lever arm to an elongated draw bar having two ends and a longitudinal axis, with said draw bar axis aligned generally parallel to said first axis;

attaching a tool support to said draw bar;

supporting said tool support for reciprocating movement generally parallel to said first axis while restraining motion transverse to said draw bar axis, whereby pivoting movement of the lever arms effects reciprocating movement of the draw bar and tool support generally parallel to the first axis; and attaching a cutting tool to said tool support, whereby the cutting tool is reciprocated in a direction generally parallel to the first axis.

18. A method as claimed in claim 17 wherein said step of reciprocating further comprises the steps of:

providing a voice coil having a first end, a second end and a longitudinal axis extending therebetween, said voice coil including a coil body, a plurality of windings circumscribing at least a portion of said coil body, with said coil axis defining said first axis;

providing a magnetic field substantially transverse to said coil axis;

attaching said pair of coil arms to said coil body proximal said coil first end on generally opposite sides of said coil axis; and introducing an alternating electrical current to said coil windings to cause said coil body to reciprocate in a direction generally parallel to said coil axis.

* * * * *

UNITED STATES PATENT AND TRADEMARK OFFICE
CERTIFICATE OF CORRECTION

PATENT NO. : 5,718,154
DATED : February 17, 1998
INVENTOR(S) : Council, Buford W., Jr.

It is certified that error appears in the above-indentified patent and that said Letters Patent is hereby corrected as shown below:

In column 7, line 14 after the word "tool" insert the word --support--.

Signed and Sealed this

Twenty-eighth Day of April, 1998

*Attest:*

BRUCE LEHMAN

*Attesting Officer*  *Commissioner of Patents and Trademarks*